United States Patent
Blaylock

(10) Patent No.: US 10,149,469 B2
(45) Date of Patent: Dec. 11, 2018

(54) COLOR REFLECTIVE DECOY APPARATUS AND METHOD OF APPLICATION

(71) Applicant: Huntwise, Inc., Monroe, LA (US)

(72) Inventor: Ian Blaylock, Monroe, LA (US)

(73) Assignee: Huntwise, Inc., Monroe, LA (US)

( * ) Notice: Subject to any disclaimer, the term of this patent is extended or adjusted under 35 U.S.C. 154(b) by 346 days.

(21) Appl. No.: 15/251,417

(22) Filed: Aug. 30, 2016

(65) Prior Publication Data

US 2017/0055520 A1 Mar. 2, 2017

Related U.S. Application Data

(60) Provisional application No. 62/212,286, filed on Aug. 31, 2015.

(51) Int. Cl.
| | |
|---|---|
| *A01M 31/06* | (2006.01) |
| *A01K 85/01* | (2006.01) |
| *A01K 85/00* | (2006.01) |
| *B44C 5/06* | (2006.01) |
| *B44F 1/10* | (2006.01) |
| *B44F 1/14* | (2006.01) |

(52) U.S. Cl.
CPC ............. *A01M 31/06* (2013.01); *A01K 85/00* (2013.01); *A01K 85/01* (2013.01); *B44C 5/06* (2013.01); *B44F 1/10* (2013.01); *B44F 1/14* (2013.01)

(58) Field of Classification Search
CPC ........ A01M 31/06; A01K 85/01; A01K 85/00
USPC .......................................................... 43/2, 3
See application file for complete search history.

(56) References Cited

U.S. PATENT DOCUMENTS

| | | | | |
|---|---|---|---|---|
| 2,909,863 | A * | 10/1959 | Rector | A01K 85/01 43/42.31 |
| 4,691,464 | A | 9/1987 | Rudolph | |
| 4,845,872 | A * | 7/1989 | Anderson | A01M 31/06 43/3 |
| 4,890,408 | A * | 1/1990 | Heiges | A01M 31/06 43/3 |
| 5,251,395 | A * | 10/1993 | Wicklund | A01K 85/00 43/42.25 |
| 5,293,709 | A * | 3/1994 | Cripe | A01M 31/06 43/3 |

(Continued)

FOREIGN PATENT DOCUMENTS

GB 2247819 A * 3/1992 ............ A01M 31/06

OTHER PUBLICATIONS

Higdon Outdoors, Magnum Full Form Shell, Feeder, Mallard 6pk, https://www.higdondecoys.com/ProductDetails.asp?ProductCode=12037, Sep. 1, 2015.

(Continued)

*Primary Examiner* — Christopher P Ellis
(74) *Attorney, Agent, or Firm* — Robert Devin Ricci; Kean Miller LLP

(57) ABSTRACT

Disclosed herein is a decoy apparatus comprising: a body (or structure) shaped to resemble at least a portion of an animal and at least a partially iridescent paint, wherein at least a portion of said body is painted such that a paint scheme is applied to said body which mimics the look and colors of the avian animal as found in nature, and where the paint is capable of emitting different colors when light reflects upon the paint. In one or more embodiments, pearl flakes are added to a clear finish coat of paint to allow for the color shift.

20 Claims, 4 Drawing Sheets

(56) References Cited

U.S. PATENT DOCUMENTS

| | | | |
|---|---|---|---|
| 6,018,902 | A | 2/2000 | Gudermuth et al. |
| 6,115,953 | A * | 9/2000 | Wise .................... A01M 31/06 40/615 |
| 7,955,695 | B2 | 6/2011 | Argoitia |
| 7,966,764 | B2 | 6/2011 | Johnson et al. |
| 8,468,737 | B2 | 6/2013 | Simmons |
| 8,490,321 | B1 | 7/2013 | Butz |
| 8,650,795 | B2 | 2/2014 | Johnson et al. |
| 8,739,456 | B1 | 6/2014 | Butz |
| 2002/0095848 | A1* | 7/2002 | Northouse ............ A01M 31/06 43/3 |
| 2007/0199228 | A1 | 8/2007 | Johnson |
| 2007/0200337 | A1* | 8/2007 | Johnson ................ A01M 31/06 283/91 |
| 2009/0000177 | A1* | 1/2009 | Johnson ................ A01K 85/01 43/17.6 |
| 2012/0055064 | A1* | 3/2012 | Pringle .................. G01J 3/465 43/2 |
| 2014/0068997 | A1* | 3/2014 | Choi ...................... A01K 85/01 43/42.33 |
| 2015/0040460 | A1* | 2/2015 | Jones .................... A01M 31/06 43/2 |
| 2015/0059228 | A1 | 3/2015 | Holmes |

OTHER PUBLICATIONS

Bird Vision, Bird Vision UV Reflective Decoy Paint, http://www.waterfowlergear.com/Bird-Vision-UV-Reflective-Decoy-Paint-Kit-Pintail-Drake-RWPKPD_p_1051.html, Dec. 31, 2015.

* cited by examiner

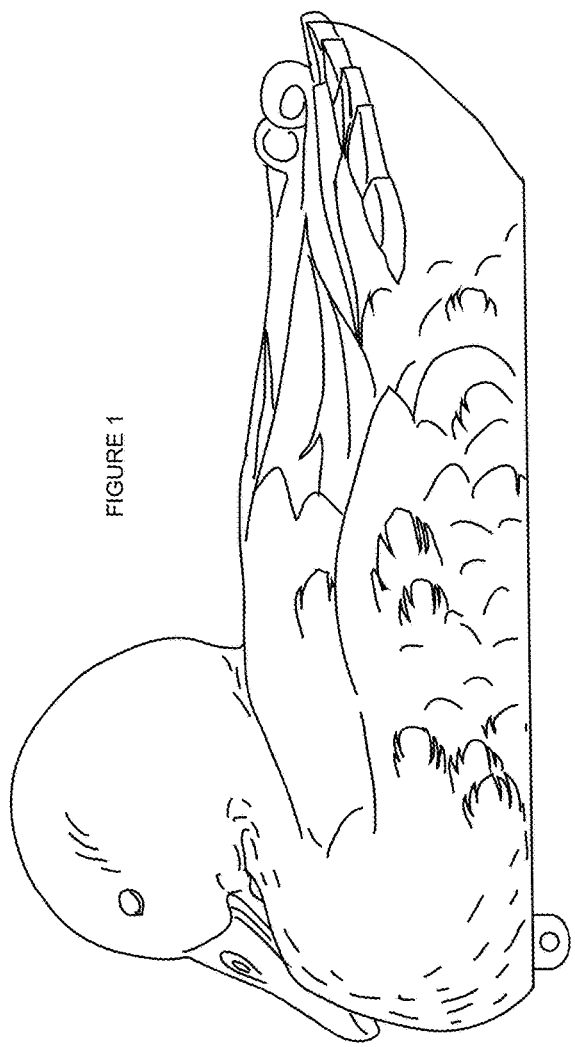
FIGURE 1
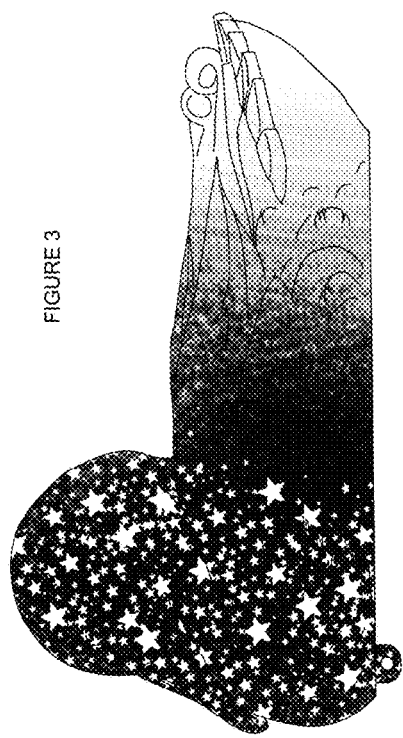
FIGURE 3
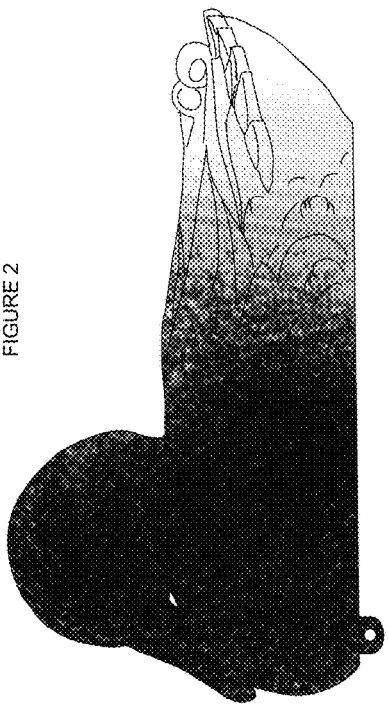
FIGURE 2
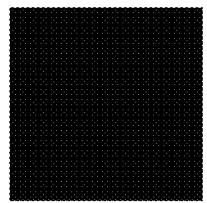
BLACK PAINT
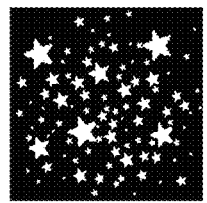
COLOR SHIFTING PEARLS

| Assay | Spec. Values |
|---|---|
| Calcium | 50-60% |
| Aluminum Borosilicate | |
| $TiO_2$ | 15-25% |
| $SnO_2$ | ≤2.0% |
| $SiO_2$ | 25-35% |
| Particle Size | 10-125μm |
| PH Value | 4-11 |
| Density | 2.3-2.8g/cm3 |
| Microbiology | <100 cfu/g |
| Oil absorption | 30-70g/100g |
| Heavy Metal | |
| As | <1ppm |
| Pb | <10PPM |
| Hg | <1PPM |
| Sb | <2ppm |
| Cd | <1ppm |
| Zn | <50ppm |

FIGURE 4

INFORMATION RELATING TO ASSAY VALUES
OF VIOLET GREEN SHIFT POWDER

| Assay | Spec. Values |
|---|---|
| Borosilicate | 55-65% |
| $TiO_2$ | 5-15% |
| $SnO_2$ | ≤2% |
| $SiO_2$ | 20-30% |
| $Fe_2O_3$ | 1-10% |
| Particle Size | 10-125μm |
| PH Value | 6-11 |
| Density: | 2.3-2.8g/cm$^3$ |
| Oil absorption | 30-70g/100g |
| Heavy Metal | |
| As | 0.005max |
| Cd | 0.010max |
| Hg | 0.005max |
| Pb | 0.010max |

FIGURE 5

INFORMATION RELATING TO ASSAY
VALUES OF GREEN GRASS SHIFT POWDER

COLOR REFLECTIVE DECOY APPARATUS AND METHOD OF APPLICATION

CROSS REFERENCE TO RELATED APPLICATIONS

This application claims priority to U.S. Provisional Patent Application No. 62/212,286, filed on Aug. 31, 2015, entitled "Color Reflective Decoy Apparatus and Method of Application."

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

It should be understood that the drawings are not necessarily to scale; instead, emphasis has been placed upon illustrating the principles of the invention. In addition, in the embodiments depicted herein, like reference numerals in the various drawings refer to identical or near identical structural elements.

FIG. 1 is an example of a water fowl decoy from the prior art.

FIG. 2 depicts the decoy from FIG. 1 with a primer applied to a portion of the decoy.

FIG. 3 depicts the decoy from FIG. 2 wherein a pearlescent finish is applied to decoy.

FIG. 4 is an informational chart relating to assay values of violet green shift powder.

FIG. 5 is an informational chart relating to assay values of green grass shift powder.

BACKGROUND OF THE INVENTION

Figure 6:
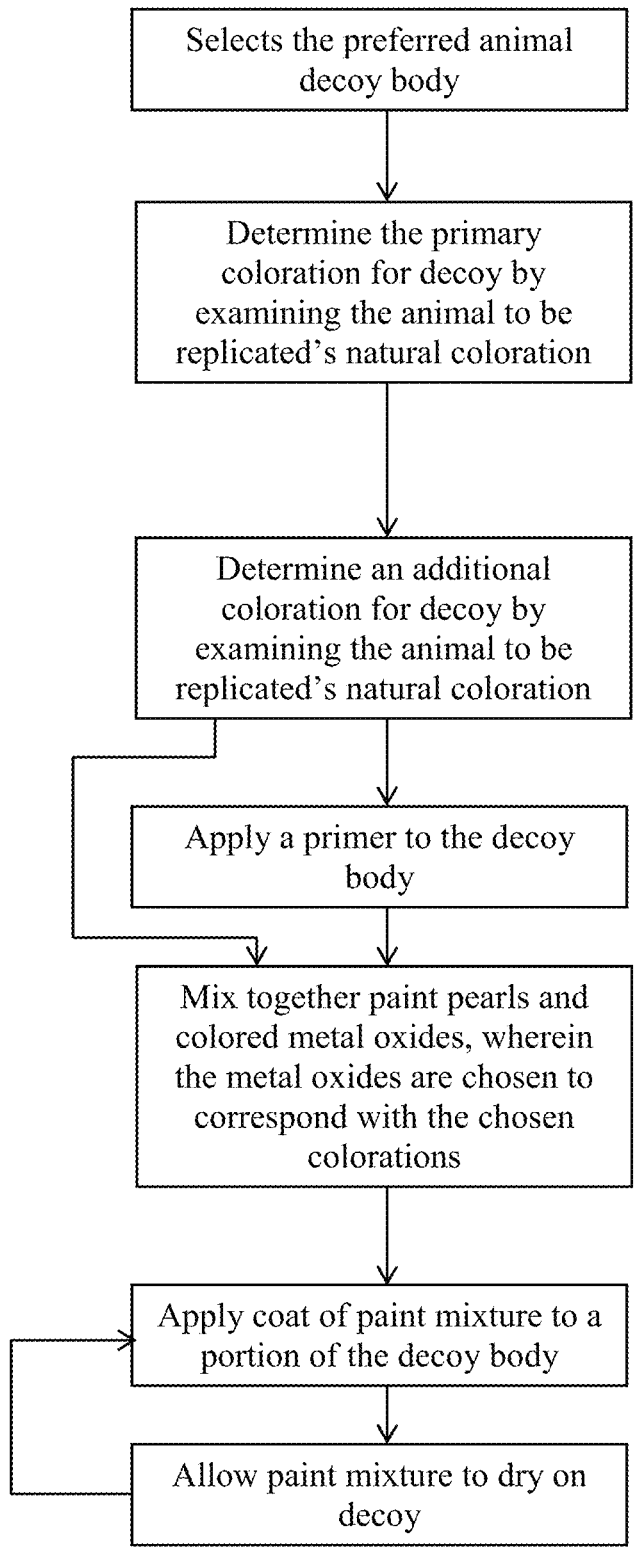
FIG. 6 depicts a flow chart showing one embodiment of a method of creating a color shift decoy apparatus.

Outdoor enthusiasts, recreational hunters, and photographers have long recognized that live animals and game, and particularly live waterfowl, are attracted to areas that appear to be inhabited by similar animals. For this reason, hunters have used decoys to attract live game to within shooting distance of a hunter's rifle, shotgun or other weapon, and within prime viewing distance of photographers and other outdoor enthusiasts. Likewise, decoys and other animal-shaped structures are also often used to deter certain animals from entering into an area such as an owl or hawk shaped decoy employed to keep mice away from an area.

In order to be effective, a decoy must resemble the animal. In theory, the more life-like a decoy will look, the more likely that the intended animal will be fooled by the decoy into behaving as intended. For example, numerous hunters place duck decoys at or near the surface of the water to signal to other ducks to approach the area. A large industry has formed around the creation and selling of these types of decoys. However, traditional decoys remain limited in appearance in that they primarily focus on displaying the dominant colors of an animal as perceived by humans.

An animal's true coloration is not so limited. Many animals in nature possess photonic crystals in their fur and feathers, which cause the colors of those feathers to shift as varying light waves reflect off the feathers. For example, in ducks, and more particularly in mallard ducks, these photonic crystals are especially notable for their iridescence and exceptionally bright coloration. It is believed that the color shifts are important to assist the animal in camouflage, communication, sensing, attractant for mating, and other not yet explored manners. A variety of ducks have dominant colorations including the typical greens, browns, whites, etc. However, as light moves across or reflects off the duck's feathers, subtle color shifts occur revealing secondary colors which vary from the primary colors, ranging from bright green to deep violet.

A decoy device is provided herein which aims to mimic the true natural coloration in animals such as ducks, including their secondary and even tertiary colors, through the use of a color shifting paint which will reflect varying colors as light passes across the paint or hits the decoy in different angles.

SUMMARY

Disclosed herein is a decoy apparatus comprising: a body (or structure) shaped to resemble at least a portion of an animal and at least a partially iridescent paint, wherein at least a portion of said body is painted with said paint such that a paint scheme is applied to said body which mimics the look and colors of the avian animal as found in nature, and where the paint is capable of emitting different colors when light reflects upon the paint at various angles. In one or more embodiments, pearl flakes are added to a clear finish coat of paint to allow for the color shift.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. In the following description, numerous specific details are provided, such as examples of apparatuses, mediums, frequencies, and application times. One skilled in the relevant art will recognize, however, that the disclosed Color Reflective Decoy Apparatus and Method of Application may be practiced without one or more of the specific details, or with other methods, components, materials, and so forth. In other instances, well-known structures, materials, or operations are not shown or described in detail to avoid obscuring aspects of the invention.

One having ordinary skill in the art would readily recognize that multiple embodiments and variations of this method may be used to apply the paint scheme to a decoy in order to utilize the color shift concept. For example, in a related embodiment, an automated machine can be used to apply the paint, wherein the paint is dried through various means before a subsequent coat is applied.

For illustrative purposes only, a decoy apparatus 0 is described herein comprising, in general, the shape of an avian animal. More particularly, the illustrative example of a decoy apparatus 0 comprises the general shape of a waterfowl's body, and more particularly, that of a mallard duck. In nature, the mallard, like many waterfowls, avian animals, and other animals, possess properties which cause their feathers or fur to reflect and refract light. For example, the mallard's feathers are known to possess photonic crystals which refract light waves coming into contact with the crystals. To this day, traditional decoy apparatuses have been created which mimic the general shape and color of the intended animal. However, these decoys fall short in that the paint used on the decoys is incapable of refracting light waves in a manner similar to that of the natural animal. Several attempts have been made to create paint for decoy apparatuses which more closely mimics the color reflection of an actual animal. For example, UV paint has been used in the past to prevent a "sheen" of sorts from reflecting off the decoy. However, even these applications have fallen short in creating a decoy which is capable of reflecting different layers of colors as would be seen in a real animal.

Provided herein is a method of applying multiple layers of paint to a decoy apparatus 0 in a manner and with components that will allow for varying colors to be visible as light reflects across the decoy, along with the resulting decoy apparatus 0. The resulting decoys have at least two main advantages over those in the prior art: (1) the painted decoys are capable of being seen at a greater distance and with greater coloration than the traditional decoy; and (2) the decoys are capable of reflecting different color variations as the angle of refraction changes. Thus, for example, as ducks fly over an area where duck-decoys created with this method are deployed, the ducks will see the decoys from a greater distance, drawing the ducks into the area. Upon nearing the area, the ducks will see the vibrant color shifts in the paint as the angle of light reflection between the duck and the decoy changes and believe them to be real ducks, causing them to approach closer to the area for rest and food.

The method for the application to create the color reflective decoy apparatus 0 involves the use of paint pearls. Paint pearls are a semi-transparent, iridescent powder that is added to paint in order to add depth to base colors. Additionally, the pearls can be used to bend light, allowing a shift of the color to occur when the viewing angle changes, such as by movement.

First, a decoy body is created to match the general shape of the selected animal. In the depicted embodiment, a decoy apparatus 0 is used which comprises the general shape of a duck, including a head 1 with a bill or beak 2, a bust 3, a back 4, and two opposing wings 5.

The decoy should preferably be primed for paint as would be understood by one having ordinary skill in the art before applying the pearlescent paint. In the decoy and method described herein for application to a mallard-like decoy, a dark primer is preferred to allow the pearlescent colors to stand out. In one or more embodiments, the dark primer is black, a dark shade of blue, green or brown. However, one having ordinary skill in the art might recognize that different color primers could be used depending on a multitude of conditions such as the paint colors to be employed and the intended after or finish effects of the paint coloration.

In the illustrative example, the decoy apparatus 0 shell is created to be substantially black in color before the paint is applied. However, if the decoy is not created from a black plastic, or if an older decoy is being repurposed with the method disclosed herein, a black primer could be applied to the decoy body.

Next a color palate is selected which corresponds with the natural coloration of the depicted animal. It is conceivable that a single decoy apparatus 0 may require multiple colors to create the natural effect. It is also conceivable that a decoy may employ one or more primary, secondary, tertiary (and so on) colors to mimic the natural colors of the intended animal for which the decoy is designed. Additionally, these colors palates may be applied to different parts or zones of a single decoy apparatus. Turning to the depicted decoy apparatus 0, it is possible and even likely in some embodiments that head 1 will have a different color as beak 2, and may have different primary, secondary and/or tertiary coloration from the head 1 to the bust 3, back 4 or wings 5. In mallard ducks, for example, the primary colors comprise blues and greens, with secondary hues of both yellow and violet.

Once the colors are chosen, the colors are blended to create a paint mix. In the depicted embodiment, a blend of blue, green, purple and gold is created to act as the paint. In a preferred embodiment, matte paint is used, but other finishes of paints could be used. The pearls are added to the paint blend in a pre-determined quantity of grams of pearl to milliliter of paint to provide the desired level of light reflection or color shift.

"Pearls" refer to pearlescent pigments that typically comprise small flakes or platelets coated with refractive metal oxides that allow for the achievement of interference effects that cause a shifting coloration. These flakes are typically chosen from a group comprising micra, silicas, clays, calcium carbonates, and talc. In a preferred embodiment, the pearl comprises a borosilicate although other silicates such as alumosilicate, or combinations of silicates (such as aluminum borosilicate) may be used. Metal oxides such as titanium dioxide, tin dioxide, silicon dioxide, iron oxide, and other metal oxides can be used to coat the flakes. In some applications, inhomogeneous metal oxides will be used to provide multiple color layers. The size of the flakes and the thickness of the metal oxide can produce a range of colors, forming a number of layers such that when light is refracted and reflected through the layers, different colors pop. In one or more embodiments, the particle size is between 5-200 microns, between 10-150 microns, between 10-125 microns, between 15-75 microns. Additionally, the pigmentation level or concentration can be changed to impact the overall effect of coloration. Examples of color pigments are set forth in FIG. 4.

In a preferred embodiment, a clear base is added to the paint mixture in order to seal the paint colors from water damage and to prevent erosion or fading of the paint from exposure to UV light. In alternate embodiments, the base is a sealant that can be applied after the layer of paint, or completely omitted. In the present embodiment, however, the sealant-pearl-paint ("SPP") mixture forms a white viscous mixture (typically due to the white silicates) when wet, which aids in ensuring a complete application. In the event that a non-sealant clear base is used, the mixture will exude a shimmering clear coloration.

The SPP mixture is applied to the decoy body as would be understood by one having ordinary skill in the art, either by brush, spray, airbrush, or other method. When only a small amount of the mixture is to be applied, the mixture may be painted on by hand; however, in larger applications or in commercial applications, the mixture may be applied through paint guns. In a preferred embodiment, at least a portion of the decoy is covered with the mixture, such as the head 1 and neck region minus the eyes and bill or beak 2. In such an embodiment, coverings may be applied to the decoy before the mixture is introduced to ensure that the mixture is not applied to these areas.

The applied SPP mixture will dry like typical paint; however, heat can be applied to speed the process through conventional means known in the art. Such exposure to heat may result from heat guns, heaters, hot air, heat lamps, or sunlight. Multiple applications may be necessary to reach the desired coating and coloration. In a preferred embodiment, at least two layers of SPP mixture are applied to the decoy body to create a deeper layered effect.

It is envisioned that a single decoy may employ multiple varieties of a common shaded color. For example, in the mallard decoy, it is envisioned that a green violet layer may be applied to the entire head. Thus a mixture containing the resin, metal oxide powders and a curing agent is added to paint thinner in a proportion of 1:1, 2:1, 2:3, and vice versa, as desired under the circumstances. This mixture is applied to entire head 1 of the decoy. Next, a second mixture of a grass green is formed of the appropriate resins, metal oxides and curing agent is created. In the present example, the grass green is the secondary coloration and therefore will be applied in a lesser quantity only to the sides of the head. For example, the primary green violet paint may be 3000 grams of resin, 90 grams of the metal oxide powder, and 500 grams of curing agent. The secondary grass green may be 1000 grams resin, 25 grams of the metal oxide powder and 160 grams of the curing agent.

Turning to FIG. 6, a flow chart is provided showing an embodiment of a method for applying the SPP to create a color reflective decoy apparatus as set forth herein. First, the animal of which the decoy is to be made is selected. Although waterfowls such as the mallard are chosen herein as an illustrative embodiment, it should be readily understood that numerous types of other bird or animal decoys are envisioned such as quail, deer, and nearly any other animal of which it may be desirable to create a decoy. Second, once an animal is selected, color palates are determined to match the natural colorations of the animal. These may be an approximation or the color palates may be determined through scientific methods such as spectrophotometry. Third, a decoy body is broken up into sections based on color palates. In some animals with uniform coloration, the need to break the decoy into sections (although only figuratively in some applications) may be unnecessary. For example, in the waterfowl mallard set forth in FIGS. 1-3, the decoy is divided into the following regions, each of which may employ its own color palate—head 1, bill or beak 2, bust 3, back 4, and two opposing wings 5. While it may be desirable to have a color shift appearance on the head 1, back 4 and wings 5, it may not be desirable to do so on the beak 2 or bust 3. If the decoy is not already a suitable color for painting, a primer is applied to prepare it to accept the SPP mixture. Once fully primed, the SPP mixture should be formed for each region of the decoy based on the appropriate color for that region. For example, in the mallard decoy, the SPP mixture will be made in order to account for the green and blue primary colors and the yellow and violet secondary colors. Once the SPP mixture is made for a particular region, a layer is applied to the region to which it corresponds. This layer is either dried or allowed to dry. If desired, one or more additional coats may be applied.

For the purpose of understanding the Color Reflective Decoy Apparatus and Method of Application, references are made in the text to exemplary embodiments of a Color Reflective Decoy Apparatus and Method of Application, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the Color Reflective Decoy Apparatus and Method of Application may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

I claim:

1. A method of creating a decoy apparatus, comprising the steps of:
   a. selecting a decoy body which resembles at least a portion of a desired animal;
   b. determining the primary coloration of the animal as it would be found in nature;
   c. determining at least one secondary coloration of the animal as it would be found in nature;
   c. creating a paint mixture comprising paint pearls and colored metal oxides wherein the metal oxides are chosen to correspond with the primary and secondary colors determined; and
   d. applying at least one coat of the paint mixture to at least a portion of the decoy body and allowing the paint to dry.

2. The method as in claim 1 wherein a clear base is applied to the decoy.

3. The method as in claim 2 wherein the clear base is a sealant.

4. The method as in claim 1 wherein the decoy is primed before it is painted.

5. The method as in claim 1 wherein a primer solution is mixed into the paint mixture before it is applied to the decoy.

6. The method as in claim 1 wherein the decoy body resembles at least a portion of an avian animal.

7. The method as in claim 4 wherein the decoy body resembles at least a portion of a waterfowl.

8. The method as in claim 1 wherein the paint pearls are selected from a group comprising micra, silicas, clays, calcium carbonates, and talc.

9. The method as in claim 1 wherein the particle size of the paint pearls is between 5-200 microns.

10. The method as in claim 1 wherein at least one metal oxide is selected from a group comprising titanium dioxide, tin dioxide, silicon dioxide, and iron oxide.

11. The method as in claim 1 wherein paint thinner is added to the paint mixture prior to application to the decoy.

12. An animal decoy apparatus comprising:
a decoy body which resembles at least a portion of a desired animal;
wherein a paint mixture comprising paint pearls and colored metal oxides are applied to at least one portion of the decoy body;
wherein the metal oxides are chosen to correspond with the primary colorations of the animal.

13. The animal decoy apparatus as in claim 12 wherein the decoy is primed for paint prior to the application of the paint mixture.

14. The animal decoy apparatus as in claim 12 wherein metal oxides are chosen to correspond with the secondary colorations of the animal.

15. The animal decoy apparatus as in claim 12 wherein the paint pearls are selected from a group comprising micra, silicas, clays, calcium carbonates, and talc.

16. The animal decoy apparatus as in claim 12 wherein the particle size of the paint pearls is between 5-200 microns.

17. The animal decoy apparatus as in claim 12 wherein at least one metal oxide is selected from a group comprising titanium dioxide, tin dioxide, silicon dioxide, and iron oxide.

18. The animal decoy apparatus as in claim 14 wherein the metal oxides corresponding with the primary coloration outnumber the metal oxides corresponding with the secondary coloration.

19. The animal decoy apparatus as in claim 12 wherein the paint is sealed with a sealant.

20. The animal decoy apparatus as in claim 12 wherein paint thinner is added to the paint mixture.

* * * * *